United States Patent
Li et al.

(10) Patent No.: US 8,577,348 B2
(45) Date of Patent: Nov. 5, 2013

(54) SYSTEM ARCHITECTURE, AND METHOD FOR SCHEDULED DOWNLOADING SERVICES

(75) Inventors: Jun Li, Plainsboro, NJ (US); Junbiao Zhang, Bridgewater, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 731 days.

(21) Appl. No.: 11/883,040

(22) PCT Filed: Jan. 31, 2005

(86) PCT No.: PCT/US2005/003070
§ 371 (c)(1),
(2), (4) Date: Jul. 25, 2007

(87) PCT Pub. No.: WO2006/085843
PCT Pub. Date: Aug. 12, 2006

(65) Prior Publication Data
US 2008/0153413 A1    Jun. 26, 2008

(51) Int. Cl.
*H04L 29/06* (2006.01)
(52) U.S. Cl.
USPC .................. 455/414.3; 455/425; 455/414.1
(58) Field of Classification Search
USPC ............ 455/425, 414.1–414.3, 456.1, 456.3, 455/412.2
See application file for complete search history.

(56) References Cited

U.S. PATENT DOCUMENTS

| | | | |
|---|---|---|---|
| 7,457,851 B2 | 11/2008 | Ramaswamy et al. | |
| 2002/0052957 A1* | 5/2002 | Shimada | 709/225 |
| 2002/0061021 A1* | 5/2002 | Dillon | 370/390 |
| 2003/0008661 A1* | 1/2003 | Joyce et al. | 455/456 |
| 2004/0054750 A1* | 3/2004 | de Jong et al. | 709/217 |
| 2005/0018695 A1 | 1/2005 | Ramaswamy et al. | |
| 2005/0038874 A1 | 2/2005 | Ramaswamy et al. | |
| 2006/0135134 A1* | 6/2006 | Mezhvinsky et al. | 455/414.1 |
| 2008/0153413 A1 | 6/2008 | Li et al. | |
| 2009/0070423 A1 | 3/2009 | Ramaswamy et al. | |

FOREIGN PATENT DOCUMENTS

| | | |
|---|---|---|
| FR | 2 832 822 A1 | 5/2003 |
| FR | 2832822 A | 5/2003 |
| JP | 2000-175250 A | 6/2000 |
| JP | 2002-189908 A | 7/2002 |
| JP | 2003-281392 A | 10/2003 |
| JP | 2004-310593 A | 11/2004 |
| WO | 03052610 A1 | 6/2003 |
| WO | 2004025922 A1 | 3/2004 |

OTHER PUBLICATIONS

Search Report dated Sep. 22, 2005.

* cited by examiner

*Primary Examiner* — Marcos Torres
(74) *Attorney, Agent, or Firm* — Robert D. Shedd; Vincent E. Duffy; Joel M. Fogelson

(57) ABSTRACT

There is provided a system for providing content through a Content Delivery/distribution Network (CDN) that includes a plurality of storage entities. A Content Requesting device (CR) generates and transmits requests for content. A Content Server (CS) receives the requests from the CR, provides notifications regarding a current location of the content, and at least one of stores the content and interfaces with the CDN to distribute the content to one of the plurality of storage entities. A Content Consuming device (CC) receives the notifications from the CS and retrieves the requested content from one of the CS and the one of the plurality of storage entities based on the current location of the content specified in the notifications.

8 Claims, 2 Drawing Sheets

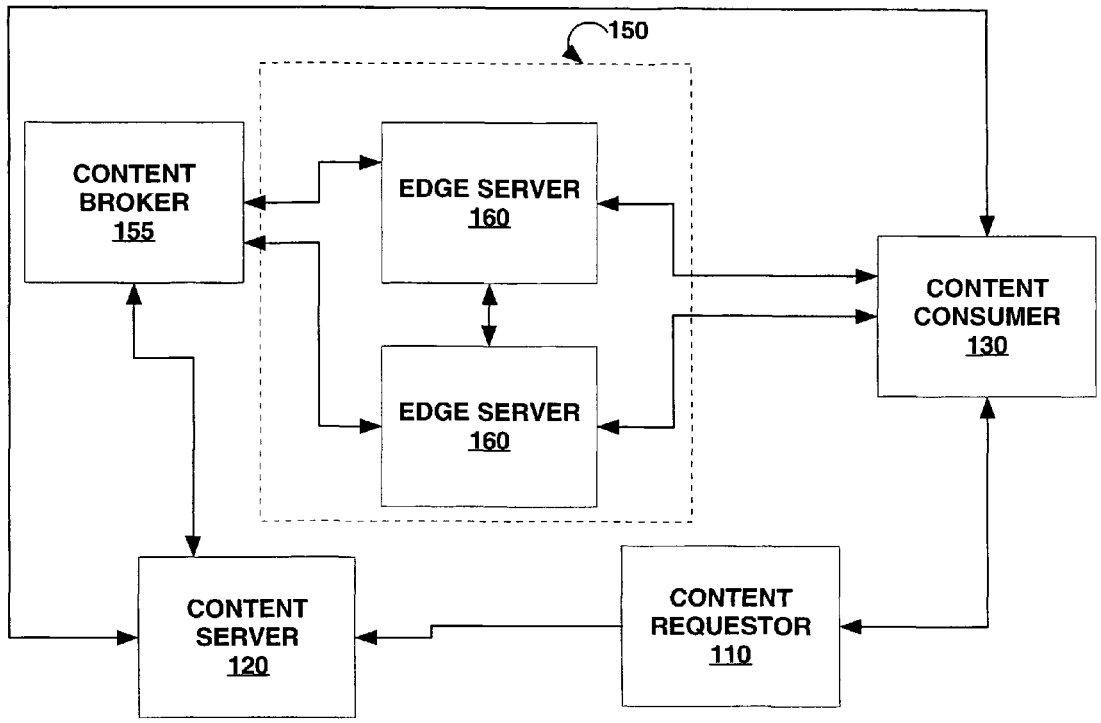

SYSTEM ARCHITECTURE, AND METHOD FOR SCHEDULED DOWNLOADING SERVICES

This application claims the benefit, under 35 U.S.C. §365 of International Application PCT/US2005/003070, filed Jan. 31, 2005, which was published in accordance with PCT Article 21(2) on Aug. 17, 2006 in English.

CROSS-REFERENCE TO RELATED APPLICATIONS

This application is related to a U.S. utility patent application Ser. No. 10/498,402, entitled "Apparatus and Methods for Delayed Network Information Transfer", filed on Dec. 6, 2002, which is commonly assigned, and the disclosure of which is incorporated herein by reference.

FIELD OF THE INVENTION

The present invention generally relates to information transfer in communication networks and, more particularly, to a system, primitives corresponding to the system, and a method, for scheduled downloading services.

BACKGROUND OF THE INVENTION

In general, downloading services are provided using a client/server model that involves the interaction between only two entities, namely a client and a server. However, there are applications that need the downloading content to be requested and consumed by different client devices at different locations and different times. For example, a mobile user wants to order a movie but is concerned about the cost of using cellular airtime for downloading the movie. In such a case, it would be desirable for the user to be able to download the movie to a hotspot or other location where access to a low cost Wireless Local Area Network (WLAN) is available.

Accordingly, it would be desirable and highly advantageous to have a downloading service that allows for content to be requested and consumed by different devices. Moreover, it would be desirable and highly advantageous if the request and consumption of the content are capable of being performed at different times and at different locations.

SUMMARY OF THE INVENTION

The problems stated above, as well as other related problems of the prior art, are solved by the present invention, which is directed to a system, primitives corresponding to the system, and a method, for scheduled downloading services.

According to an aspect of the present invention, there is provided a system for providing content through a Content Delivery/distribution Network (CDN) that includes a plurality of storage entities. A Content Requesting device (CR) generates and transmits requests for content. A Content Server (CS) receives the requests from the CR, provides notifications regarding a current location of the content, and at least one of stores the content and interfaces with the CDN to distribute the content to one of the plurality of storage entities. A Content Consuming device (CC) receives the notifications from the CS and retrieves the requested content from one of the CS and the one of the plurality of storage entities based on the current location of the content specified in the notifications.

According to an aspect of the present invention, in a Content Server (CS) for storing content, there is provided a method for providing the content through a Content Delivery/distribution Network (CDN). The CDN includes a plurality of storage entities. A request for the content is received from a Content Requesting device (CR). A content query is provided to the CDN in response to the request. The content query identifies at least a location of a Content Consuming device (CC). A downloading request is received from one of the plurality of storage entities included in the CDN for the content to be downloaded thereto, when the content is not currently stored in any of the plurality of storage entities. A notification regarding a current location of the content is provided from the CS to the CC. The content is retrieved by the CC from one of the CS and the one plurality of storage entities, based on the current location of the content specified in the notification.

These and other aspects, features and advantages of the present invention will become apparent from the following detailed description of preferred embodiments, which is to be read in connection with the accompanying drawings.

BRIEF DESCRIPTION OF THE DRAWINGS

FIG. 1 is a high-level block diagram illustrating a system 100 for scheduled downloading services to which the present invention may be applied, according to an illustrative embodiment of the present invention;

FIG. 2 is a diagram illustrating a table of primitives that are supported by the system 100 of FIG. 1, according to an illustrative embodiment of the present invention.

DETAILED DESCRIPTION OF THE INVENTION

Figure 3:
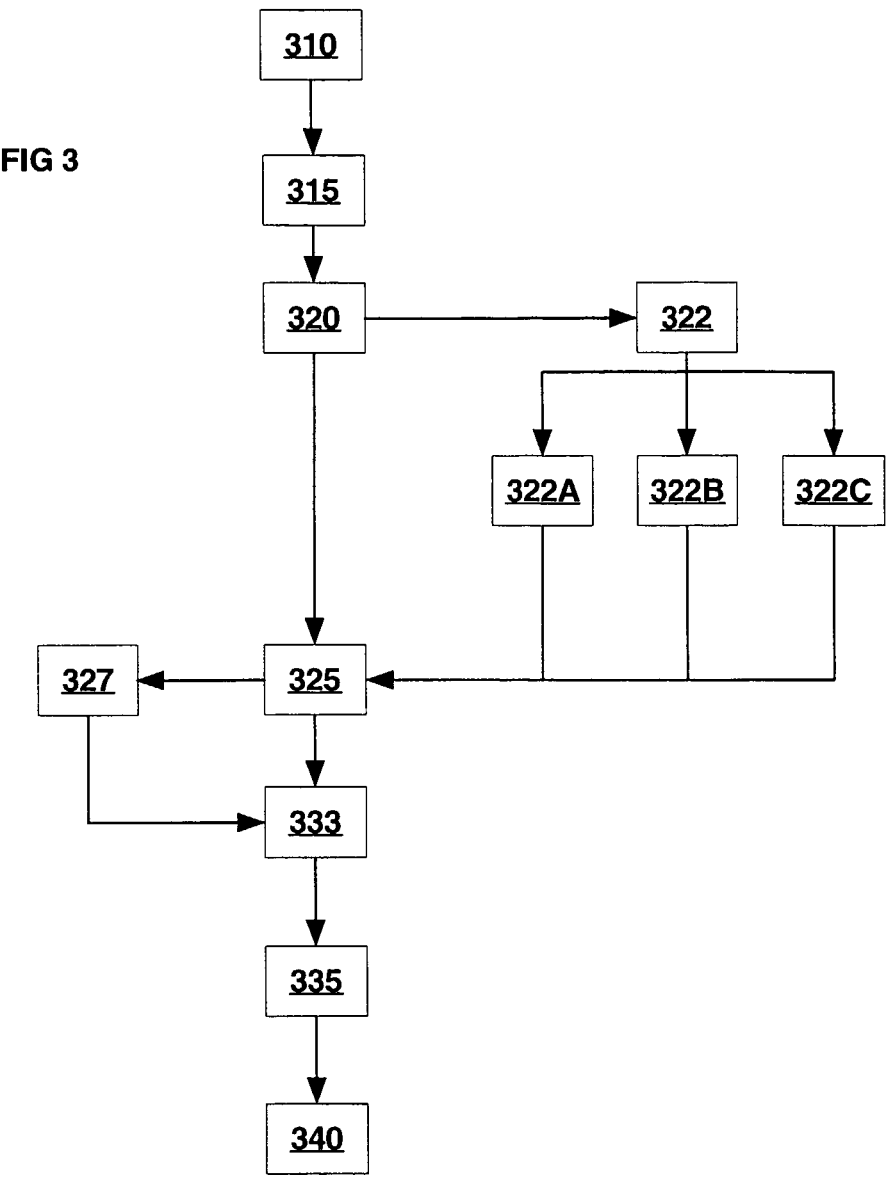
FIG. 3 is a flow diagram illustrating a method for downloading content through a Content Delivery/distribution Network (CDN), according to an illustrative embodiment of the present invention.

The present invention is directed to a system, primitives corresponding to the system, and a method, for scheduled downloading services. Advantageously, the present invention allows for the requesting and consumption of content by different devices. Moreover, the present invention allows for the request and the consumption of the content to be performed at different times and at different locations. Accordingly, the present invention advantageously optimizes network resource utilization and reduces the cost of content delivery to the consumer.

Thus, in the example given above regarding the mobile user who wants to order a movie but is concerned about the cost of using cellular airtime for downloading the movie, the user would be able to order the movie using his/her cellular telephone and then the movie could be downloaded to another device belonging to the user such as, for example, a Personal Digital Assistant (PDA), a video recorder, a video player, and so forth. The request and consumption of the movies could be performed at different times and from different locations. For example, the user could order the movie while on the road on his/her way home from work using his/her cellular telephone, and the movies could be downloaded later by the user's video player at the user's home or by the user's laptop at a hotspot that the user is stopping at on the way home. Thus, the mobile user in above example can use cellular network to access the movie server's website to make the order and later can download the movie content through wireless LAN at low cost and fast speed.

It is to be understood that the present invention may be implemented in various forms of hardware, software, firmware, special purpose processors, or a combination thereof.

Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The present invention provides a novel service model (also referred to herein as a "triangle model") for scheduled downloading services that involves three main entities, namely a "Content Requester" (CR), a "Content Server" (CS), and a "Content Consumer" (CC). In a triangle model, a requesting device (the Content Requester) of a user requests a file from a server (the Content Server), the file is distributed from the server to a receiving device (the Content Consumer) of the user. These entities are described in further detail herein below with respect to FIGS. 1 and 2. Moreover, these entities are also described in a U.S. patent application entitled "Apparatus and Methods for Delayed Network Information Transfer", Ser. No. 10/498,402 filed on Dec. 6, 2002, which is commonly assigned, and the disclosure of which is incorporated herein by reference.

FIG. 1 is a high-level block diagram illustrating a system 100 for scheduled downloading services to which the present invention may be applied, according to an illustrative embodiment of the present invention. It is to be appreciated that the system 100 is scalable and provides secure service requirements in a diversified network environment.

The communication system 100 includes three main entities, namely, a Content Requester (CR) 110, a Content Server (CS) 120, and a Content Consumer (CC) 130. The CR 110 and the CC 130 are also interchangeably referred to herein as the "Content Requesting device" and the Content Consuming device, respectively.

The CR 110 is the device from which a content request is initiated by a customer. The CS 120 is the device that provides the content corresponding to the content request (i.e., the CS is the source of the content) or is somehow else involved in the obtaining of the content. The CC 130 is the device that receives the content for consumption by the customer (e.g., for visual reproduction in the case of video content, for audible reproduction in the case of audio content, and so forth).

Thus, the CS 120 can be implemented as an application server that is accessible (by its customers) through a public/private network. The CR 110 and the CC 130 can be wireless or wired devices on the same or difference access networks. For example, any one or both of the CR 110 and the CC 130 may be, for example, a personal computer (PC), a laptop computer, a Personal Digital Assistant (PDA), an enhanced cellular telephone (i.e., a cellular telephone having capabilities beyond simple voice telecommunications, a Personal Video Recorder (PVR), and so forth. It is to be appreciated that in some embodiments of the present invention, the CR 110 and the CC 130 may be implemented on the same device. However, in a preferred embodiment of the present invention, the CR 110 and the CC 130 are implemented on separate devices.

Content is delivered through one or more content delivery/distribution networks (CDNs) 150 disposed between the CS 120 and the CC 130. The CDNs 150 are overlay networks on a public/private transport network, such as the Internet. The structure of the CDNs 150 can either be flat or hierarchical.

The CDNs 150 include Edge Servers (ESs) 160 that have storage and transport capabilities. For example, the Edge Servers 160 are storage devices that also run downloading applications accessible through an access network for the CC 130. It is to be appreciated that "Edge Servers" 160 are also interchangeably referred to herein as "storage entities".

The CS 120 can contract with one or more CDNs 150 to obtain the content distribution service. The CS 120 can interface with a CDN 150 through one or more CDN Brokers (CBs) 155 to assign content distribution requests to the CDN 150 without direct control of any entity inside the CDN 150, such as, for example, an Edge Server 160.

Each of the CBs 155 is a control server that interfaces the CS 120 and the CDNs 150. Each of the CBs 155 has a trusted relationship with the CS 120 and the Edge Servers 160 included in the CDNs 150. It is to be appreciated that while the CBs 155 are described as being control servers, the CBs 155 may also be implemented simply as interfaces to the CDN 150. That is, given the teachings of the present invention provided herein, one of ordinary skill in the related art will contemplate these and other implementations of the CBs 155, while maintaining the spirit of the present invention.

The communication system 100 optionally utilizes or communicates through a Public Switched Telephone Network, the Internet, cellular network, or any other communications network. Such communication networks can be any type of wireless and/or wired Internet Service Provider (ISP). Additionally, such networks may use communication protocols and architectures including, but not limited to, Internet Protocol (IP), General Packet Radio Service (GPRS), cable/Digital Subscriber Line (DSL), corporate Local Area Network (LAN), and so forth. Importantly, the described communications network embodiments may be used to supplement the communications between devices that are not handled through CDN 150.

Basically, there are no restriction on the deployment of the CS 120, CB 155, and ES 160, as long as system primitives and corresponding commands are supported. FIG. 2 is a diagram illustrating a table of primitives that are supported by the system 100 of FIG. 1, according to an illustrative embodiment of the present invention. Such system primitives relate to, for example, content requests (e.g., from the CR 110 to the CS 120), content queries (e.g., from the CS 120 to the CB 155), content scheduling and delivery (e.g. downloading from CS 120 to ES 160), finished downloading notification (e.g. providing by ES 160 to CS 120), delivery notifications (e.g., from the CS 120 to the CC 130), and content retrieval (e.g., between the 130 CC and the ES 160). More detailed descriptions will now be given of these system primitives.

Regarding content requests from the CR 110 to the CS 120, a secure session can be established based on a content subscription of the CR 110 with the CS 120 and/or based on a current pay-per-view. The secure session can be any form of interaction for content request through narrowband or broadband, wired or wireless access networks. A web application is the most common method to perform a content request. Of course, other applications/methods may also be used to perform a content request.

Regarding content queries from the CS 120 to the CB 155, a secure session can be established using a CDN 150, based on a content delivery contract between the CS 120 and the CDN 150. The content delivery contract specifies details regarding the delivery (and/or storage) of content from the CS to other entities (e.g., the CC 130) through the CDN. Such details may include, but are not limited to, the type of content, the volume of content, to which entities and at what location the content may be delivered to, and so forth. The CB 155 is the interface for the CS 120 to use the CDN 150. In a content query, the CS 120 requests the CB 155 to have the CDN 150 distribute the content to a desired location (e.g. an entity such as an ES 160).

Regarding content scheduling and delivery, a schedule and delivery mechanism (push or pull) is agreed upon between the CS 120 and the ES 160. A firewall may be employed as the ES is usually in a subscription network while the CS is on the Internet 180. Since the content request is assigned to the ES 160 through the CB 155, the CS 120 does not have to know the assigned ES 160 until at ES 160 contacts the CS 120 for a scheduled delivery.

Regarding delivery notification from the CS 120 to the CC 130, such delivery notification may be performed using, for example, INSTANT MESSENGER, electronic mail (e-mail), and so forth.

Regarding content retrieval between the CC 130 and the ES 160, a secure access is presumed. In response to delivery notification (from, e.g., the CS 120 to the CC 130), the CC 130 will go to the ES 160 to obtain the content.

A description will now be given of two illustrative functions relating to the CDN 150, namely, content queries/reports between the CB 155 and the ES 160 and content referring between two of the Edge Servers 160. Regarding content queries/reports between the CB 155 and the ES 160, the CB 155 collects ES information periodically including, but not limited to, a cached content directory and cache availability based on statistical and/or scheduled caching activities. The collected ES information is used by the CB 155 to determine which of the Edge Servers 160 currently has the requested content or is capable of storing the content until retrieval by the CC 130. In the latter case, the content may have been initially stored in an ES 160 relatively remote from the CC 130 and then transferred to an ES 160 that is more proximate to the CC (or more capable of providing the content to the CC, based on pre-defined criteria including, but not limited to, bandwidth, reliability, and so forth).

Regarding content referring between two Edge Servers, this may involve requesting contents from another ES instead of from the CS 120.

FIG. 3 is a flow diagram illustrating a method for downloading content through a Content Delivery/distribution Network (CDN), according to an illustrative embodiment of the present invention. The CDN is capable of interfacing with a Content delivery/distribution network Broker (CBs) and includes a plurality of storage entities (e.g., Edge Servers 160).

A request for content is generated by the CR 110 (step 310), and transmitted to the CS 120 (step 315). The request may be transmitted via an access network, the Internet, and so forth.

The current location of the requested content is determined by the CB 155 (step 320). Step 320 may involve, for example, determining whether the content is currently contained in one or more of the plurality of storage entities 160 or, if none of the plurality of storage entities currently contain the content, then determining which of the plurality of storage entities 160 can accommodate the content. Preferably, although not necessarily, the latter determination is made with respect to an expected service time period during which it is preferable that the content be stored for subsequent retrieval by the CC 130. Both determinations may involve optionally involve evaluating content-related information obtained at step 322.

At step 322, content-related information is collected by the CB 155 from the plurality of storage entities 160. This information may be used to determine which, if any, of the plurality of storage entities 160 contains content that is currently being requested. Step 322 may involve generating a content query for content-related information (step 322A), transmitting the content query from the CS 120 to the CB 155 (step 322B), and receiving a content report from the plurality of storage entities by the CB 155 that includes the content-related information (step 322C). The content query may identify a location of the CC 130, a content title, and/or an expected delivery time. It is presumed that the CS 120, in general, always includes the requested content, as a user will typically enter into a paid subscription arrangement with the CS 120 regarding the delivery of content. It is to be appreciated that while step 322 is shown and described herein as occurring dynamically as needed (i.e., on-line), the content-related information and/or a portion thereof may also be collected off-line, for example, at pre-designated times, in response to pre-designated events, and/or even randomly.

The CB 155 assigns a content distribution request to one of the plurality of storage entities 160 (step 325). The content distribution request includes location information for content referring, i.e., identifying one of the plurality of storage entities from which the content is to be retrieved by the assigned ES 160.

If the content is not currently in any of the plurality of storage entities 160 and is not to be provided to the CC 130 directly from the CS 120, then a downloading request is sent to the CS 120 from one of the plurality of storage entities 160 (step 327). The downloading request is a request made from a storage entity 160 to the CS 120, for the content to be downloaded from the CS 120 to that storage entity 160. In a preferred embodiment of the present invention, the downloading request is a scheduled downloading request that specifies a desired time at which the content is to be downloaded.

In either case, the assigned ES will send a downloading finish notification to CS 120 to indicate the content is ready for the CC 120 to retrieve (step 333).

A content retrieve notification is provided from the CS 120 to the CC 130 that identifies a current location from where the content is to be retrieved by the CC 130 (step 335). The notification may specify that the content may be retrieved from one of the plurality of storage entities or from the CS 120 itself. The notification is provided after the content has been distributed to the storage entity 160, if any, from which it is to be retrieved by the CC 130. The notification may be performed using, for example, INSTANT MESSENGER, electronic mail (e-mail), and so forth The CC 130 then retrieves the content from the CS 130 or from the assigned ES, based on the current location of the content specified in the notification (step 340). It is to be appreciated that the CC 130 may retrieve the content directly from the CS in the case when the CDN 150 is unavailable for delivering the content to one of the plurality of storage entities.

Advantageously, the system architecture and primitives proposed herein are directed to transfer large size, high quality multimedia content services in a downloading service with schedules.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

The invention claimed is:

1. In a Content Server for storing content, a method for providing the content through a communication network, the method comprising the steps of:
    receiving a request for the content from a Content Requesting device, the received request specifying a location of a content consuming device and a time, in the future, for the delivery;
    providing a content query to the communication network in response to the request, the content query identifying at least a location of the Content Consuming device;
    receiving a downloading request from a storage entity proximate to the location of the Content Consuming device included in the communication network for the content to be downloaded thereto, when the content is not currently stored in said storage entity proximate to the location of the Content Consuming device; and
    scheduling a delivery by providing delivery notifications from the content server to the content consuming device specifying a current location of said storage entity proximate to the location of the Content Consuming device containing the content, the scheduling means schedules delivery of the requested content according to the received request;
    retrieving the content by the content consuming device from the proximate storage entity, based on the current location of the proximate storage entity or the content server when the proximate storage entity is not available.

2. The method of claim 1, wherein the content server interfaces with the communication network via a Content delivery/distribution network Broker.

3. The method of claim 2, further comprising the step of receiving content-related information from the Content delivery/distribution network Broker collected from the proximate storage entity for use by the content server in providing the notification.

4. The method of claim 3, wherein the content-related information comprises at least one of a cached content directory and cache availability based on at least one of statistical and scheduled caching activities.

5. The method of claim 1, wherein the content is retrieved by the content consumer, in response to a receipt of the notification.

6. The method of claim 1, wherein the downloading request is received from the proximate storage entity, if any, based on a location of the content consumer specified in the content query.

7. The method of claim 1, wherein the content query further identifies at least one of a content title and an expected delivery time.

8. The system of claim 1, further comprising the step of receiving another notification from the proximate storage entity, the other notification for indicating that the content is ready for downloading from the proximate storage entity by the content consumer.

* * * * *